No. 776,508. Patented December 6, 1904.

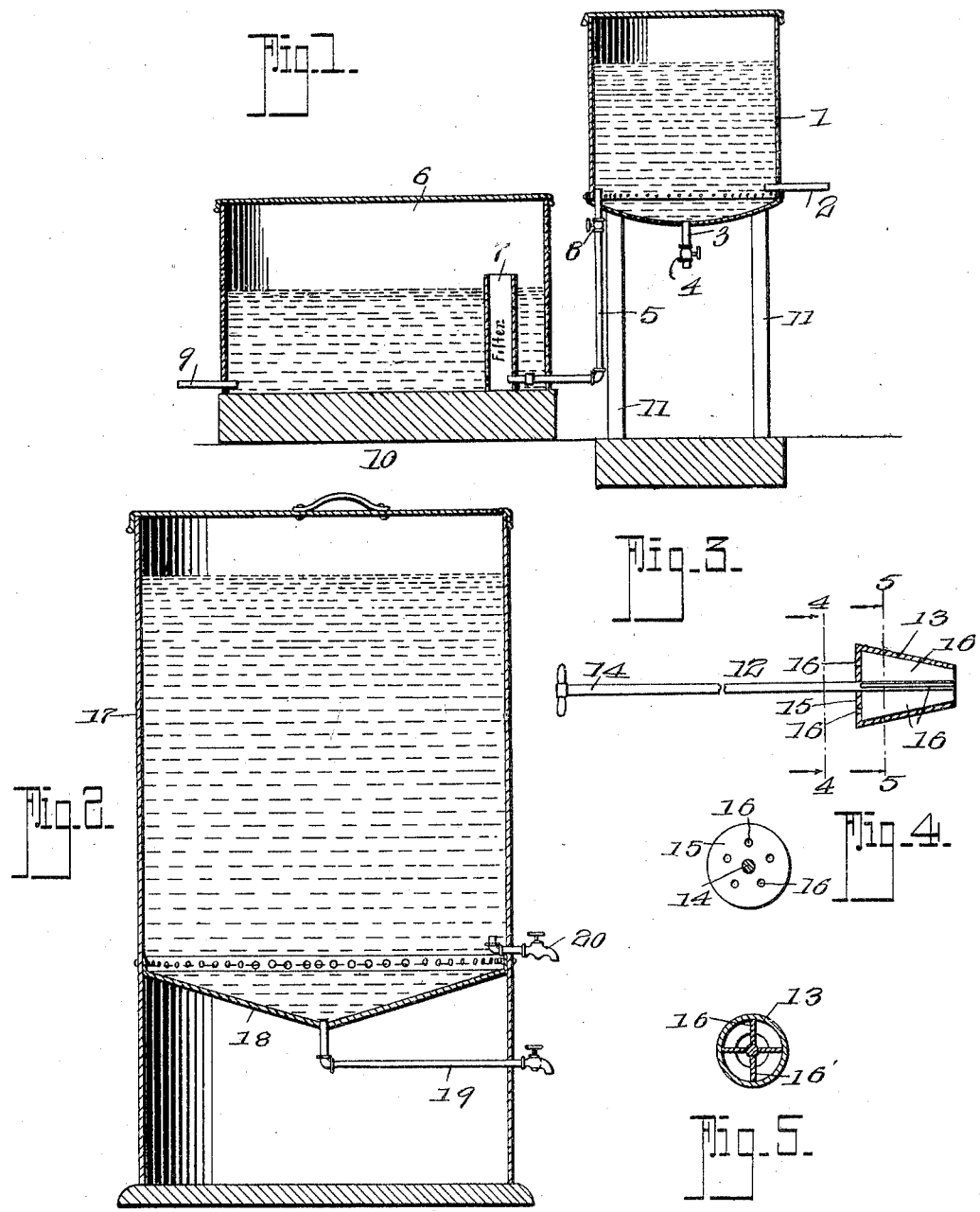

UNITED STATES PATENT OFFICE.

THOMAS E. FULGHUM, OF GRAND JUNCTION, COLORADO, ASSIGNOR OF ONE-HALF TO ALBERT A. MILLER, OF GRAND JUNCTION, COLORADO.

PROCESS OF PURIFYING WATER.

SPECIFICATION forming part of Letters Patent No. 776,508, dated December 6, 1904.

Application filed August 17, 1904. Serial No. 221,106. (No specimens.)

*To all whom it may concern:*

Be it known that I, THOMAS E. FULGHUM, a citizen of the United States, residing at Grand Junction, in the county of Mesa and State of Colorado, have invented a new and useful Process of Purifying Water, of which the following is a specification.

This invention relates to an improved process of purifying water for domestic and industrial use, first, by the removal from the water of the earth salts, lime, magnesia, &c., rendering it soft, fitting it for domestic and mechanical purposes, resulting in a saving of soap when used for laundry purposes, preventing scale in steam-boilers, rendering it healthful for domestic use and more suitable for all mechanical purposes; second, by the removal of the organic matter from the water, thereby sterilizing it to the development of disease-germs and the support of bacterial life; third, by aerating the water, thereby causing the aggregation of the particles in suspension, thus hastening precipitation, and by the addition of air rendering the water more palatable by the removal of the flat taste due to the absence of carbonic acid.

The process consists in, first, introducing a reagent into the water with slight but sufficient agitation to cause the necessary aeration to cause the absorption of the gases holding in solution earth salts, such as lime, magnesia, &c.; second, in the addition after a sufficient period of an oxidizer in sufficient quantities and of a character to produce coagulation, the introduction of the oxidizer being accompanied with agitation and aeration, after which the water is allowed to remain still to clear itself by precipitation or, if desired, by filtration.

The use of the oxidizer, with the addition of air, renders soluble organic matter insoluble. Also by its reaction with the reagent it causes the impurities not only to coagulate, but by the mechanical action of the air to agglomerate the particles in suspension, thereby facilitating precipitation.

The principal object of the invention is to enable the purification of water to be accomplished easily, quickly, and inexpensively not only on a large scale for industrial and for general supply purposes, but on a small scale for family use as well.

To enable the invention to be carried practically into effect, I have devised the simple apparatus which has been shown in the accompanying drawings, in which—

Figure 1 is a vertical sectional view illustrating an apparatus for carrying out the invention on a large scale for industrial purposes. Fig. 2 is a vertical sectional view showing a modified apparatus adapted for family use. Fig. 3 is a longitudinal sectional view of the aerator or agitator. Fig. 4 is a transverse sectional view of the latter, taken on the line 4 4 in Fig. 3. Fig. 5 is a transverse sectional view taken on the line 5 5 in Fig. 3.

Corresponding parts in the several figures are indicated by similar characters of reference.

Referring to Fig. 1 of the drawings, 1 designates a tank into which the impure water may be introduced through a pipe 2. The tank 1 has a concave bottom provided with a sludge-pipe 3, having a globe-valve 4. From the tank 1, at a point near the bottom of the latter, a pipe 5 leads through the outer wall of a pure-water tank 6 to a filter 7, disposed within said tank, the pipe 5 being provided with a valve 8. The tank 6 has an outlet 9. Foundations 10 are provided for the two tanks, the former of which is elevated upon legs or supports 11, so as to enable the contents thereof to pass by gravity to the filter in the tank 6. 12 designates an agitator or aerating device which is adapted to be operated manually, said device including a funnel-shaped casing 13, fixed at the end of a rod or handle 14, said casing being provided at its upper end with a lid 15, having small perforations 16. The lower end of the casing 13 may open, and the casing is preferably provided with interiorly-disposed wings or braces 16'.

Referring to Fig. 2 of the drawings, 17 designates a tank having a concave or funnel-shaped bottom 18, from the lower part of which extends a valved sludge-pipe 19. The tank is provided just above the bottom with a valved pipe 20, through which pure water may be drawn.

In carrying the invention into effect I first prepare a reagent composed of a saturated solution of sodium bicarbonate, five pounds; sodium carbonate, five pounds, and sodium borate, one pound. I dissolve in this proportion in pure water all that the water will take up. The water to be treated is introduced into the tank 1 of Fig. 1 or into the tank 17 of Fig. 2, and the reagent is added thereto in the proportion of twenty drops to each gallon of water, the contents of the tank being agitated with the device provided for the purpose, so as to cause a thorough aeration to take place. The water is now permitted to remain at rest for a sufficient period to permit the absorption of the gases holding the earth salts in solution, after which I introduce an oxidizer consisting of a solution of chorid of iron, which may be used in the proportion of about six drops to the gallon of water or any sufficient quantities to produce coagulation, the water being again agitated and aerated. After this the water is permitted to remain still to clear itself by precipitation, after which the sludge may be drawn off. In the apparatus provided for domestic purposes the water freed from its impurities may be drawn off directly from the tank 17, through the pipe 20. In the larger plant illustrated in Fig. 1 the water will be caused to pass through the filter 7 into the storage-tank 6.

While my improved process of purifying water is capable of being successfully used on a larger scale, I consider it to be of even greater importance, owing to the facility with which it may be carried out on a small scale, for domestic purposes, the time occupied in the treatment of the water being comparatively trifling and the means required to carry the process into operation being of the simplest nature.

The chemicals used in carrying out the process are entirely harmless, and the water purified by the improved process is clean and palatable.

Having thus described the invention, what is claimed is—

A process of purifying water which consists in adding thereto in suitable proportions a reagent consisting of a saturated solution of sodium bicarbonate, five pounds; sodium carbonate, five pounds; and sodium borate, one pound; agitating and aerating; after a time adding an oxidizer consisting of a solution of chlorid of iron; agitating and aerating; and after settling removing the sludge.

In testimony that I claim the foregoing as my own I have hereto affixed my signature in the presence of two witnesses.

THOMAS E. FULGHUM.

Witnesses:
GEORGE M. JANES,
G. VAN HOVREBEKE.